Dec. 13, 1949     T. H. LONG     2,491,189
APPARATUS FOR ANALYZING WAVES
Filed June 16, 1945     2 Sheets-Sheet 1

Inventor:
Thomas H. Long,
By Dawson, Ooms and Booth
Attorneys.

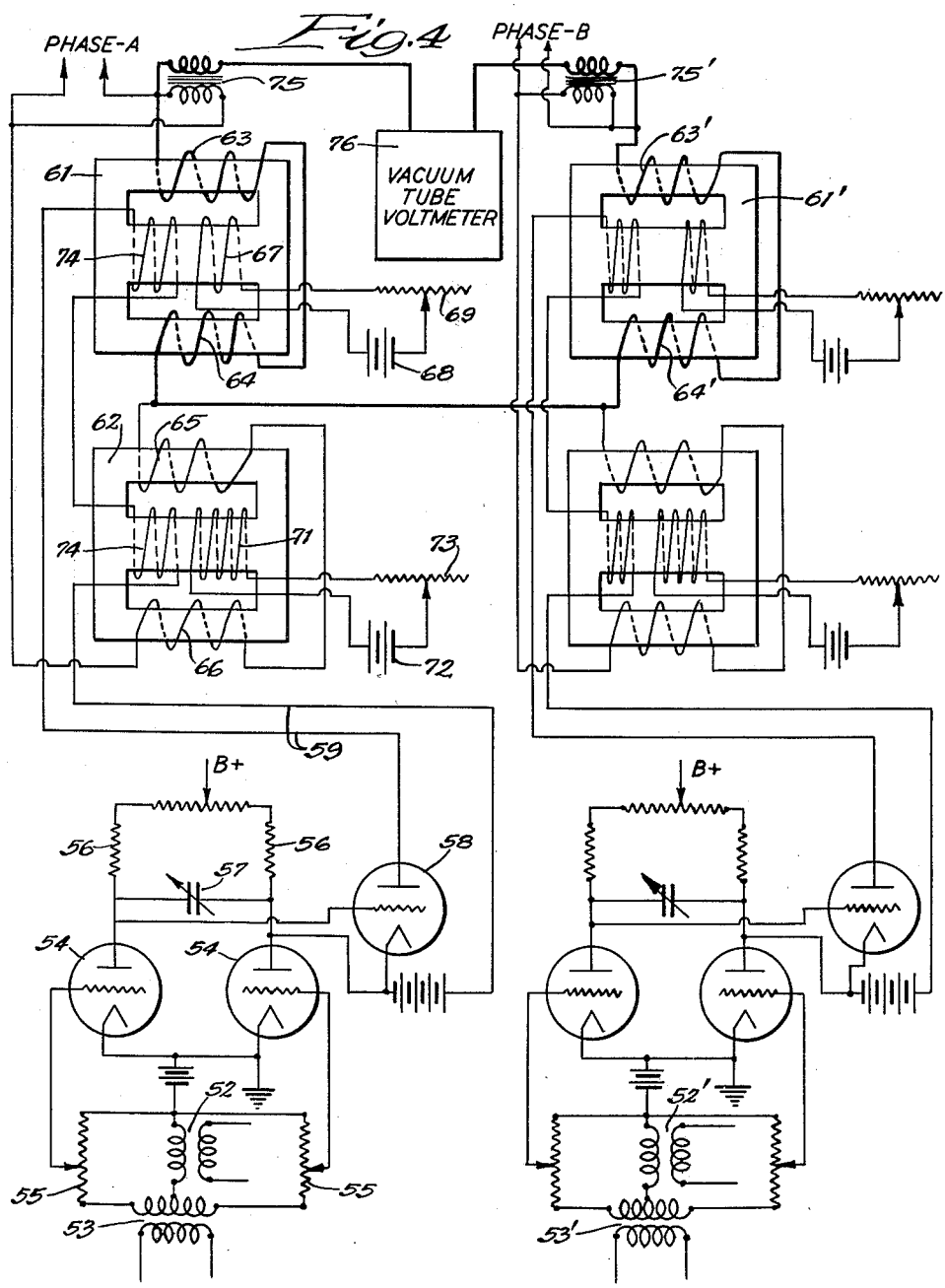

Patented Dec. 13, 1949

2,491,189

UNITED STATES PATENT OFFICE 2,491,189

APPARATUS FOR ANALYZING WAVES

Thomas H. Long, Elkhart, Ind., assignor to C. G. Conn, Ltd., Elkhart, Ind., a corporation of Indiana Application June 16, 1945, Serial No. 599,907

14 Claims. (Cl. 175—183)

1

This invention relates to apparatus for analyzing waves and more particularly to the analysis of complex waves such as musical tones to determine the harmonic content or partials thereof.

Previously known types of wave analyzing apparatus have been phase sensitive, requiring adjustment for maximum reading to determine accurately the wave amplitude. In cases where only a single frequency component is to be measured such apparatus is quite satisfactory but where several components are to be measured such apparatus has required a long sustained wave to provide time for the required manipulation of the apparatus.

It is one of the principal objects of the present invention to provide wave analyzing apparatus which is phase insensitive so that instantaneous readings can be obtained.

Another object is to provide apparatus by which simultaneous indication of a plurality of component or harmonic frequencies of a complex wave can be obtained.

Still another object is to provide apparatus by which the relative amplitudes of a plurality of component frequencies or harmonics can be determined without requiring adjustment of the apparatus to correspond to any of the frequencies.

A further object is to provide apparatus for analyzing waves which is automatically operated by the wave to be analyzed to indicate simultaneously the values of the several component frequencies making up the wave.

A still further object is to provide apparatus for analyzing waves in which voltages corresponding to the amplitudes of the wave at phase positions displaced 90° from each other are added vectorially to indicate the maximum amplitude of the wave independent of phase.

Still another object is to provide means for vectorially adding voltages which are phase displaced from each other.

The above and other objects and advantages of the invention will be more readily apparent from the following detailed description when read in connection with the accompanying drawings in which—

Figure 4 is a diagram of one of the discriminators.

Figure 1:
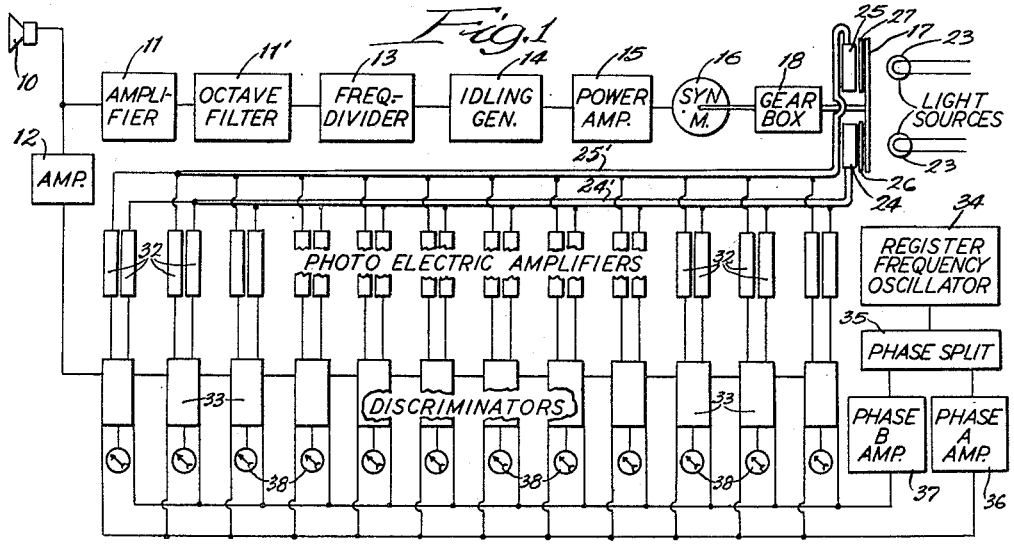
Figure 1 is a block diagram of one form of apparatus embodying the invention.

As shown in the block diagram of Figure 1 the

2 apparatus includes a translating device such as a microphone 10 for picking up a wave to be analyzed and converting it into an electric voltage of the same frequency and wave form. It will be understood that the wave to be analyzed may be a musical tone or any other desired type of wave phenomena. The microphone 10 supplies electrical energy to an amplifier 11 and a second amplifier 12.

The amplifier 11 supplies the amplified voltage to an octave filter 11' and the filtered voltage is fed to a frequency divider 13. The frequency divider is connected to an idling generator 14 which supplies a power amplifier 15. The output of the power amplifier is utilized to drive a synchronous motor 16 which drives a pattern disc 17 through a gear box 18.

Figure 2:
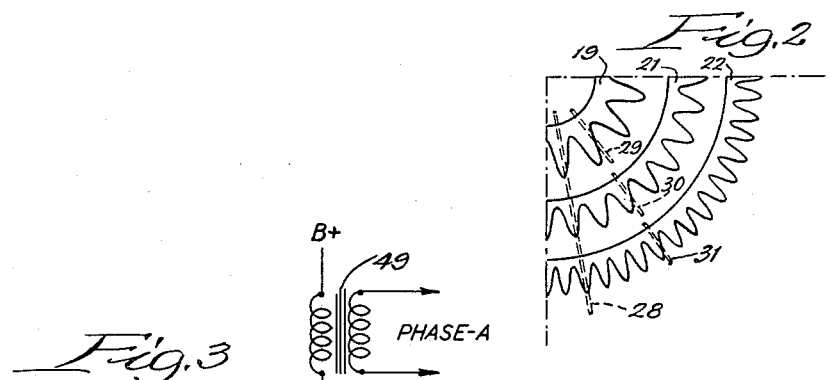
Figure 2 is an illustrative fragmentary view of one form of the pattern disk structure.

The octave filter 11' may be a series of low pass filters selectively connectable in the circuit. The upper pass limits of the filters may be set at any desired values, such for example as 50, 100, 200, 400, etc., cycles per second. It will be noted that the cut off of these filters need not be especially sharp since the fundamental requirement is that they shall prefer, for example, 26 cycles to 52 cycles or 49 cycles to 98 cycles even though the higher frequency is of greater amplitude. The octave filter and frequency divider are coordinated with the gear box 18 so that, for example, the 50 cycle low pass filter corresponds to the inoperative position of the frequency divider so that the frequency passing through the divider will be unchanged. The apparatus may conveniently be adjusted in such a way that when 50 cycle current is passed by the octave filter the motor 16 will operate at 1500 R. P. M. which is the synchronous speed of a 4 pole 50 cycle motor. The gear box may be so adjusted that at this motor speed the disc 17 will be driven at 187.5 R. P. M. 50 cycles per second corresponds to 3,000 cycles per minute, and to get this from a disc turning 187.5 R. P. M. requires 16 cycles per revolution. The disc may accordingly be formed with an inner or fundamental pattern 19 as shown in Figure 2 providing 16 cycles throughout its circumference. A second pattern 21 of 32 cycles is provided for the second harmonic, a third pattern 22 of 48 cycles for the third harmonic. It will be understood that any desired number of annular patterns as shown may be arranged on the disc for analysis of the corresponding number of harmonic or component frequencies.

When higher fundamental frequency waves are to be analyzed the octave filter must be set to pass a frequency as high as the fundamental frequency of the wave as, for example, 100 cycles per second. This frequency divider is then set to divide this frequency by two so that the output frequency to the power amplifier and the motor will be 50 cylces per second. The motor will therefore run at the same speed, but the gear box 18 may be adjusted to drive the disc at double its original speed or 375 R. P. M. to double the frequencies provided by the patterns. This arrangement is preferable to avoid running the motor at excessive speeds. The idling generator is provided merely to supply a minimum frequency below the lowest expected fundamental frequency to maintain the motor in operation so that it can come up to synchronous speed more quickly when a voltage is supplied through the microphone.

In the form shown the pattern disc 17 is transparent or transluscent and the pattern rings thereon are made opaque. The disc is illuminated by one or more light sources 23 of constant intensity and light passing through the disc is picked up by sets of photo-electric cells 24 and 25. Preferably each of the sets of photoelectric cells includes a separate cell for each of the pattern rings.

Light passing through the pattern is directed to the cells through mask 26 which is formed with relatively narrow slits extending radially of the disc to determine the position on the pattern at which the cells will be energized. This mask has a portion 27 located in front of cells 25. In the illustrative view of Figure 2, the disc 26 is formed with a continuous radial slit 28 extending across all of the pattern rings which are so arranged that when the widest part of any pattern is opposite the slit corresponding parts of all of the other patterns will be opposite the slit. The mask 26 is formed with a series of slits 29, 30 and 31 corresponding to the several patterns respectively and so located with respect to the slit 28 as to be displaced 90 degrees in phase on the respective pattern rings from the slit 28. These additional slits may be located relatively close to the slit 28 as shown in Figure 2 or at more nearly diametrically opposed positions so that the cells 24 and 25 may be diametrically opposed as shown in Figure 1. In this way the sets of photo-electric cells 24 and 25 will generate two voltages for each of the pattern rings which are displaced 90 electrical degrees in phase from each other.

The individual photo-electric cells in the sets 24 and 25 are individually connected to amplifiers 23 by separate wires in cables 24' and 25'. The amplifiers 32 are substantially identical so that their outputs will be of substantially equal amplitude. The amplifiers are arranged in pairs as shown and are connected to the corresponding cells in the sets 24 and 25. In this way the outputs of a pair of amplifiers will be voltages of equal frequency and amplitude displaced 90 degrees in phase. The frequency of the output voltages of each pair of amplifiers will correspond to the frequency generated by one of the pattern rings.

Figure 3:
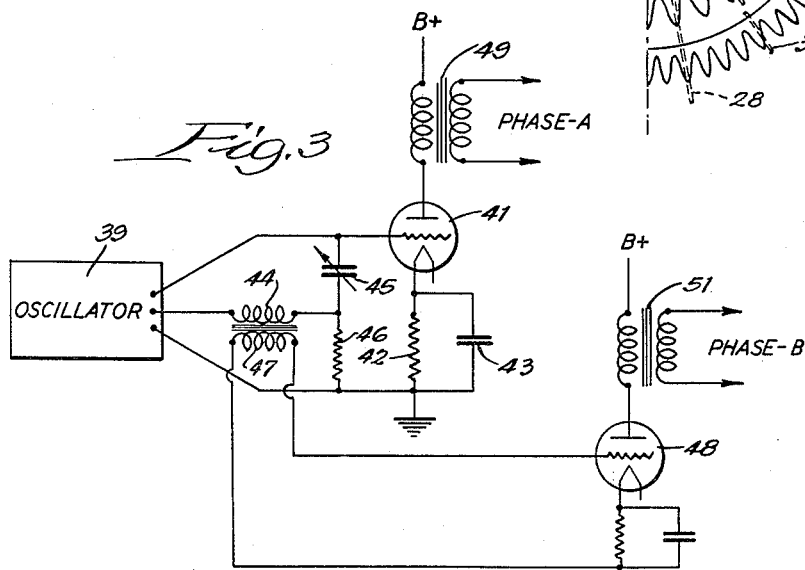
Figure 3 is a diagram of the register frequency oscillator.

The amplifier outputs are supplied to discriminators 33, each discriminator receiving the amplifier output voltages of the same frequency. The discriminators are also supplied with register voltages from a register frequency oscillator 34. As seen in the block diagram the oscillator 34 is connected through a phase split unit 35 to a pair of amplifiers 36 and 37 whose output currents will be equal in amplitude and frequency but displaced 90 degrees in phase. The amplifiers 36 and 37 are both connected to each of the discriminators 33 and the indications of the discriminators are shown on meters or the like 38. The register frequency oscillator is illustrated diagrammatically in Figure 3 as including a conventional type oscillator circuit 39. The outer terminals of the oscillator 39 are connected across the grid circuit of an amplifier tube 41 through a resistance 42 and condenser 43 in parallel. The center tap of the oscillator is connected through a transformer primary winding 44 to the midpoint between a condenser 45 and resistance 46 connected across the outer taps of the oscillator. When the condenser reactance is equal to the resistance in series with it the voltage between their common point and the center tap of the oscillator will be 90 electrical degrees out of phase with the voltage across the amplifier tube 41. A transformer secondary winding 47 is coupled to the winding 44 and is connected across the grid circuit of a tube 48 similar to the tube 41. The outputs of the tubes 41 and 48 will therefore be 90 degrees out of phase.

The plate circuit of the tube 41 is connected through a transformer 49 to the phase A amplifier 36 and the plate circuit of the tube 48 is similarly connected through a transformer 51 to the phase B amplifier 37. The amplifiers 36 and 37 are preferably made substantially identical so that their outputs will be identical in frequency and wave form and 90 degrees out of phase.

One of the discriminator circuits is shown in detail in Figure 4 and comprises two sides which are substantially identical. One side of the discriminator circuit is supplied with the voltage from the phase A amplifier 36 together with one of the voltages from the photo-electric amplifier 32 and the amplified wave to be analyzed from the amplifier 12. Referring, for example, to the circuit shown on the left side of Figure 4, the amplifier 12 supplies the wave to be analyzed to a transformer 52 and the photo-electric voltage from the amplifier 32 is supplied to a double transformer 53. The transformers 52 and 53 form a part of an electric watt meter circuit of the type shown, for example, in the patent to Peterson, No. 1,586,533. As shown the circuit includes a pair of vacuum tubes 54 connected to a transformer circuit through adjustable resisters 55 and having their plate circuits interconnected through resistors 56 and a condenser 57. An amplifier tube 58 is connected across the plate circuits of the two tubes 54 and will supply a direct current to its output wires 59 whose value is proportional to the amplitude of the component frequency in the wave supplied to the transformer 52 which corresponds in frequency to the voltage supplied to the transformer 53. Operation of the circuit for this purpose is fully explained in the Peterson patent and will not be repeated here.

The left side of the discriminator circuit is completed by a reactance unit which together with the watt meters serves to add vectorially the voltages corresponding to the component of the wave to be analyzed at 90 degree phase displaced positions. The reactance unit as shown comprises a pair of magnetic cores 61 and 62 of the three-legged type having on their outer legs windings 63, 64, 65 and 66. The upper core 61 and its windings form a control reactor and the lower core with its windings form a balancing reactor which is provided for the purpose of producing a linear response to the output of the watt meter. The windings 63, 64, 65 and 66 are connected in series across the output of the phase A transformer 49 to be supplied with register frequency current thereby.

The reactance of the windings is controlled by variably saturating the cores 61 and 62. For this purpose the core 61 is provided with a direct current biased winding 67 on its center leg supplied with saturating voltage from a battery 68 through a rheostat 69. The center leg of the core 62 is similarly provided with a biasing winding 71 supplied with saturating current from a battery 72 through a rheostat 73. It will be noted that the number of turns in the winding 67 is substantially less than that in the winding 71 for a purpose to appear later.

The center legs of the cores 61 and 62 additionally carry control windings 74 connected in series to the wires 59. The windings 74 will therefore be supplied with direct current whose value is dependent on the output of the watt meter.

Where only a single core, such for example as the core 61 and its associated windings, is used, variation in reactance in the windings 63 and 64 will vary according to a non-linear function. When the second core 62 is provided connected as shown to the windings on the core 61, a substantially linear change in voltage across the windings 63 and 64 on the control reactor will become a substantial linear function of the control current supplied to the windings 74. In this unit, assuming for example that the maximum range of the watt meter circuit is sufficient to vary the D. C. excitation in the saturating windings 74 from 80 to 160 ampere turns, the circuit should be so adjusted that when the harmonic voltage in the transformer 52 is in phase with the voltage supplied to the transformer 53, a 120 ampere turn excitation of the coils 74 corresponds to zero voltage in the transformer 53, and 160 ampere turn excitation corresponds to maximum voltage in the transformer 52, and 80 ampere turns corresponds to maximum voltage in the transformer 52 opposite in phase to that in the transformer 53. The winding 67 on the upper reactor is so adjusted that it will provide minus 70 ampere turn excitation, and the winding 71 on the lower reactor is adjusted to provide minus 170 ampere turn excitation. Then when the tube 58 is supplying sufficient current to provide 80 ampere turn excitation, the net saturating curent on the upper or control reactor will amount to plus 10 ampere turns, and that on the lower or balancing reactor will amount to minus 90 ampere turns. The voltage drop across the coils 63 and 64 on the control reactor will at that time amount to 80% of the applied voltage. Similarly, when the amplifier tube 58 supplies sufficient current to provide 120 ampere turn excitation, the net saturating current on the upper reactor will be plus 50 ampere turns, and that on the lower reactor will be minus 50 ampere turns, so that the voltage drop across the windings 63 and 64 will be 50% of the applied voltage. At maximum excitation of 160 ampere turns on the windings 74, the net saturating effect on the upper reactor will amount to plus 90 ampere turns, and that on the lower reactor to minus 10, producing a 20% voltage drop across the upper reactor. It has been found that with this arrangement the voltage drop across the upper reactor varies substantially linearly with the exciting current supplied by the watt meter.

The right hand side of the discriminator as shown in Figure 4 is substantially identical with the left hand side and parts thereof corresponding to like parts on the left hand side have been indicated by the same reference numerals primed. The transformer 52' of the right hand side is also supplied with the complex voltage corresponding to the wave to be amplified from the amplifier 12, and the transformer 53' is connected to the other amplifier 32 of the pair whose frequency outputs are identical. Thus the output of the right hand watt meter circuit will vary with the amplitude of the selected harmonic corresponding in frequency to the voltage supplied to the transformer 53' times a function of the phase angle between them. It is noted that the output of a watt meter circuit of this type is equal to the product of the two applied voltages times the cosine of the phase angle between them. Since the two voltages applied to the transformers 53 and 53' are spaced 90 degrees in phase, the vectorial sum of the products of these voltages and the voltage applied to the transformers 52 and 52' will be equal to the amplitude of that component of the voltage applied to the transformers 52 and 52' having the same frequency as the voltages applied to transformers 53 and 53'.

To produce this product from the circuit shown, the windings 63 and 64 on the core 61 are connected in series to the windings 63' and 64' on the core 61'. This series circuit is supplied through transformers 75 and 75' connected respectively across the phase A supply and the phase B supply. A vacuum tube volt meter 76 which may form one of the indicators 38 is connected in this circuit to indicate the sum of the voltages around the circuit.

With the circuit connected as shown variations in the reactance of the several windings of the two control reactors will so balance that the sum of the two voltages around the entire series circuit excluding the volt meter but including the transformers 75 and 75' will be equal to the amplitude of the components supplied to the transformers 52 and 52'. It will therefore be seen that the volt meter 76 will indicate accurately the maximum amplitude of the harmonic or component frequency in the input wave which is supplied to the particular discriminator in question.

In using the apparatus a wave to be analyzed may be supplied to the amplifiers 11 and 12 as, for example, through the microphone 10, and will cause the disc 17 to be driven at a speed proportional to the fundamental frequency of the wave. The photoelectric system will produce a series of pairs of voltages corresponding respectively in frequency to the frequencies of the components or harmonics of the input wave and displaced 90 degrees in phase from each other. These voltages are combined in the discriminator circuits with the input wave to produce instantaneous indications on the meters 38 proportional to the amplitude of the several components of the input wave and irrespective of phase. It will be noted that all of the indicators will operate simultaneously and instantaneously to produce simultaneous indications of the harmonic values of the input wave so that a long sustained input wave is not necessary. It will also be noted that the frequency of the input wave is not controlling since the disc 17 is driven at a speed proportional to its fundamental frequency. Thus with this apparatus any desired type of complex wave can be quickly and accurately analyzed without requiring adjustments for phase or frequency variations.

By the term "vectorially" as used in the appended claims I refer to the addition of vectors representing the peak amplitudes of two sinusoidal alternating waves, the vectors being taken at right angles to each other.

The term "polyphase harmonics" is used in the appended claims to refer to a plurality of balanced polyphase alternating waves of a frequency harmonically related to the fundamental frequency of the wave referred to.

The term "electronic wattmeter" is used in the appended claims to refer to a device, such as the tubes 54 and their associated circuits, capable of producing a wave of magnitude determined by the integral of the product of two input waves.

While one embodiment of the invention has been shown and described in detail, it will be understood that this is illustrative only and is not to be taken as a definition of the scope of the invention, reference being had for this purpose to the appended claims.

What is claimed is:

1. Apparatus for analyzing waves comprising means controlled by a wave to be analyzed to produce a pair of waves of equal frequency but displaced from each other in phase, means controlled by said waves and by the wave to be analyzed to produce outputs corresponding respectively to the amplitude of the wave to be analyzed at the phase positions of the pair of waves, means to add said outputs vectorially, and indicating means responsive to the last named means to indicate the amplitude of the wave to be measured independent of phase.

2. Apparatus for analyzing complex waves comprising means controlled by a wave to be analyzed for generating a plurality of polyphase harmonics of the fundamental frequency of the wave, a plurality of discriminating means responsive to the wave and to said polyphase harmonics to produce outputs corresponding respectively to the amplitudes of the partials of the complex wave corresponding to the harmonics at phase positions corresponding to the phase positions of the harmonics, means to add the outputs vectorially, and indicating means responsive to the last named means.

3. Apparatus for analyzing complex waves comprising means for generating polyphase voltages having frequencies substantially the same as the frequencies of the components of the complex wave to be measured, a plurality of discriminating means responsive to the wave and to the frequencies respectively to produce outputs corresponding to the amplitudes of the components at the phase positions of the frequencies, means for adding vectorially the outputs corresponding to the same component, and indicating means responsive to the last named means.

4. Apparatus for analyzing complex waves comprising means operated by a wave to be analyzed to generate a plurality of polyphase voltages having frequencies corresponding to the fundamental and a plurality of harmonics of the waves, a plurality of discriminating means to combine the wave with said voltages respectively to produce outputs corresponding with the amplitudes of the individual components of the wave at the phase positions of the voltages, means to add vectorially the outputs corresponding to the same component, and indicating means responsive to the last named means.

5. Apparatus for analyzing complex waves comprising means operated by a wave to be analyzed to generate a plurality of polyphase voltages having frequencies corresponding to the fundamental and a plurality of harmonics of the waves, a plurality of electronic watt meters each responsive to the wave to be analyzed and to one of said voltages to produce outputs proportional to the product of the amplitude of the component of the wave corresponding in frequency to the voltage, the voltage and a function of the phase angle between them, and means to add vectorially the outputs of the wattmeters.

6. Apparatus for analyzing waves comprising generating means for generating two voltages corresponding in frequency to the wave to be analyzed but displaced 90° from each other in phase, means for combining said voltages respectively with the wave to produce outputs proportional to the product of the amplitude of the wave, the voltages, and a function of the phase angle between them, and means to add said outputs vectorially.

7. Apparatus for analyzing waves comprising generating means for generating two voltages corresponding in frequency to the wave to be analyzed but displaced 90° from each other in phase, a pair of electronic wattmeters each responsive to the wave to be analyzed and to one of said voltages, and means to add the outputs of the electronic wattmeters vectorially.

8. Apparatus for analyzing waves comprising generating means for generating two voltages corresponding in frequency to the wave to be analyzed but displaced 90° from each other in phase, a pair of electronic wattmeters each responsive to the wave to be analyzed and to one of said voltages, and means to add the outputs of the electronic wattmeters vectorially, said last named means including a pair of saturable reactors, means responsive to the wattmeter outputs to control saturation of the reactors respectively, windings on the reactors connected in series, means to supply a substantially constant register voltage to the windings, and means to indicate the voltage drop across the windings.

9. Apparatus for analyzing waves comprising generating means for generating two voltages corresponding in frequency to the wave to be analyzed but displaced 90° from each other in phase, a pair of electronic wattmeters each responsive to the wave to be analyzed and to one of said voltages, and means to add the outputs of the electronic wattmeters vectorially, said last named means including two pairs of saturable reactors, series connected windings on the reactors of each pair, connections from the saturating windings for the pairs of reactors respectively to the electronic wattmeters whereby reactance of the series connected windings will be varied in accordance with the outputs of the wattmeters, means to supply voltages displaced from each other 90° in phase to the first named windings on the pairs of reactors respectively, means connecting the windings on one reactor of each pair in series, and means to measure the voltage drop across the last mentioned windings.

10. Apparatus for analyzing waves comprising a pattern member having thereon a plurality of sinusoidally varying patterns of harmonically related frequencies, a light source to illuminate the pattern member, a plurality of photoelectric pickups adjacent the pattern member so placed as to produce voltages spaced 90° in phase for each of the patterns and corresponding in frequency to the product of the numbers of segments in the patterns and the speed of the pattern member, modulators responsive to a wave to be analyzed and to said voltages respectively each to produce an output proportional to the product of one of the voltages, the component of the wave corresponding in frequency to the frequency of said one of the voltages and a function of the phase angle between them, and means to add vectorially the outputs of the modulators corresponding to the same frequency.

11. Apparatus for analyzing waves comprising translating means for converting a complex wave to be analyzed into a complex voltage corresponding in form to the wave form, a pattern member having a plurality of sinusoidally varying patterns thereon, means to illuminate the pattern member, a pair of photoelectric pickups mounted adjacent each pattern on the pattern member and so spaced as to generate voltages of the same frequency which are 90° out of phase, a plurality of modulators each responsive to the complex voltage and to one of the last named voltages to produce an output proportional to said one of the last named voltages, the component of the complex voltage of the same frequency as said one of the last named voltages, and a function of the phase angle between them, and means to add vectorially the modulator outputs which are responsive to the same frequencies.

12. Apparatus for analyzing waves comprising translating means for converting a complex wave to be analyzed into a complex voltage corresponding in form to the wave form, a pattern member having a plurality of sinusoidally varying patterns thereon, means to illuminate the pattern member, a pair of photoelectric pickups mounted adjacent each pattern on the pattern member and so spaced as to generate voltages of the same frequency which are 90° out of phase, a plurality of modulators each responsive to the complex voltages and to one of the last named voltages to produce an output proportional to said one of the last named voltages, the component of the complex voltage of the same frequency as said one of the last named voltages, and a function of the phase angle between them, means to add vectorially the modulator outputs which are responsive to the same frequencies, and means responsive to the complex voltage to drive the pattern member at a speed proportional to the fundamental frequency of the complex voltage.

13. Apparatus for analyzing waves comprising means for producing a pair of voltages of substantially constant amplitude corresponding in frequency to the wave to be analyzed and displaced 90° from each other in phase, means for producing a voltage corresponding in frequency and amplitude to the wave to be analyzed, a pair of modulators each responsive to the last named voltage and one of the first named voltages to produce an output proportional to the product of the voltages and a function of the phase angle between them, and means to add the outputs of the modulators vectorially.

14. Apparatus for analyzing waves comprising means for producing a pair of voltages of substantially constant amplitude corresponding in frequency to the wave to be analyzed and displaced 90° from each other in phase, means for producing a voltage corresponding in frequency and amplitude to the wave to be analyzed, a pair of modulators each responsive to the last named voltage and one of the first named voltages to produce an output proportional to the product of the voltages and a function of the phase angle between them, a pair of saturable reactors, reactance windings on the reactors, saturating windings on the reactors connected to the modulators respectively, means to supply alternating voltages to the reactance windings, and means to measure the series voltage drop across the reactance windings.

THOMAS H. LONG.

REFERENCES CITED

The following references are of record in the file of this patent:

UNITED STATES PATENTS

| Number | Name | Date |
|---|---|---|
| 1,799,202 | Wegel et al. | Apr. 7, 1931 |
| 1,901,400 | Morrison | Mar. 14, 1933 |
| 1,976,481 | Costner | Oct. 9, 1934 |
| 1,994,232 | Schuck, Jr. | Mar. 12, 1935 |
| 2,159,790 | Freystedt et al. | May 23, 1939 |
| 2,210,936 | Geyer | Aug. 13, 1940 |
| 2,241,371 | Huxford | May 6, 1941 |
| 2,362,372 | Halfmann | Nov. 7, 1944 |